US008354458B2

(12) United States Patent
Wu et al.

(10) Patent No.: US 8,354,458 B2
(45) Date of Patent: Jan. 15, 2013

(54) POLYESTER POLYOL ACRYLATE CONTAINING INTERMEDIATE TRANSFER MEMBERS

(75) Inventors: Jin Wu, Pittsford, NY (US); Jonathan H. Herko, Walworth, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 166 days.

(21) Appl. No.: 12/871,236

(22) Filed: Aug. 30, 2010

(65) Prior Publication Data

US 2012/0049124 A1 Mar. 1, 2012

(51) Int. Cl.

| | |
|---|---|
| ***C08F 2/50*** | (2006.01) |
| ***C08J 3/28*** | (2006.01) |
| ***G03G 15/00*** | (2006.01) |
| ***G03G 15/14*** | (2006.01) |

(52) U.S. Cl. ........ 522/104; 522/107; 522/113; 522/114; 522/119; 522/120; 522/121; 522/123; 522/150; 522/153; 252/500; 252/501.1; 252/519.3; 252/519.33; 399/302; 399/303; 399/411

(58) Field of Classification Search .................. 522/104, 522/107, 113, 114, 119, 120, 121, 123, 150, 522/153; 252/500, 501.1, 519.3, 519.33; 399/302, 303, 411

See application file for complete search history.

(56) References Cited

U.S. PATENT DOCUMENTS

| | | | | |
|---|---|---|---|---|
| 5,487,707 | A | 1/1996 | Sharf et al. | |
| 6,139,784 | A | 10/2000 | Oshima et al. | |
| 6,228,543 | B1 * | 5/2001 | Mizuno et al. | 430/17 |
| 6,318,223 | B1 | 11/2001 | Yu et al. | |
| 6,397,034 | B1 | 5/2002 | Tarnawskyj et al. | |
| 6,440,515 | B1 | 8/2002 | Thornton et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 7,361,437 | B2 * | 4/2008 | Weed et al. | 430/7 |
| 2009/0297232 | A1 | 12/2009 | Wu | |
| 2010/0055328 | A1 | 3/2010 | Wu et al. | |
| 2011/0293891 | A1 * | 12/2011 | Leyden et al. | 428/172 |

OTHER PUBLICATIONS

U.S. Appl. No. 12/413,645, filed Mar. 30, 2009.
U.S. Appl. No. 12/413,638, filed Mar. 30, 2009.
U.S. Appl. No. 12/413,651, filed Mar. 30, 2009.
U.S. Appl. No. 12/550,589, filed Aug. 31, 2009.
U.S. Appl. No. 12/550,594, filed Aug. 31, 2009.
U.S. Appl. No. 12/624,589, filed Nov. 24, 2009.
U.S. Appl. No. 12/749,539, filed Mar. 30, 2010.

* cited by examiner

*Primary Examiner* — Sanza McClendon
(74) *Attorney, Agent, or Firm* — Eugene O. Palazzo

(57) ABSTRACT

A UV curable intermediate transfer media, such as a belt, that includes for example, a first supporting substrate, such as a polyimide substrate layer, and a second surface layer of a mixture of a dendritic, crosslinked, or branched polyester polyol acrylate, an acrylate, an optional vinyl monomer, and a photoinitiator component.

23 Claims, No Drawings

POLYESTER POLYOL ACRYLATE CONTAINING INTERMEDIATE TRANSFER MEMBERS

CROSS REFERENCES TO RELATED APPLICATIONS

Copending U.S. application Ser. No. 12/749,539, filed Mar. 30, 2010, entitled Fluoropolyimide Single Layered Intermediate Transfer Members, the disclosure of which is totally incorporated herein by reference, illustrates for example, an intermediate transfer member comprised of a fluoropolyimide and a conductive component such as a carbon black.

Copending U.S. application Ser. No. 12/749,539, filed Mar. 30, 2010 entitled Fluoropolyimide Intermediate Transfer Members, the disclosure of which is totally incorporated herein by reference, illustrates for example, an intermediate transfer member comprised of a polyimide substrate, and thereover a fluoropolyimide.

Copending U.S. application Ser. No. 12/550,589, filed Aug. 31, 2009 entitled Carbon Black Polymeric Intermediate Transfer Members, illustrates for example, an intermediate transfer member comprised of a mixture of carbon black, a first copolymer comprised of a polyester, a polycarbonate and a polyalkylene glycol, and a second polymer.

Copending U.S. application Ser. No. 12/413,645, filed Mar. 30, 2009 entitled Layered Intermediate Transfer Members, illustrates for example, an intermediate transfer member comprised of a polyimide substrate, and thereover a polyetherimide/polysiloxane.

Copending U.S. application Ser. No. 12/413,638, filed Mar. 30, 2009, entitled Perfluoropolyether Polymer Grafted Polyaniline Containing Intermediate Transfer Members, illustrates for example, an intermediate transfer member comprised of a substrate and in contact with the substrate a polyaniline grafted perfluoropolyether phosphoric acid polymer.

Copending U.S. application Ser. No. 12/413,651, filed Mar. 30, 2009, entitled Polyimide Polysiloxane Intermediate Transfer Members, illustrates for example, an intermediate transfer member comprised of at least one of a polyimide/polyetherimide/polysiloxane, and a polyimide polysiloxane.

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is for example, an intermediate transfer belt comprised of a substrate comprising a polyimide and a conductive component wherein the polyimide is cured at a temperature of, for example, from about 175 to about 290° C. over a period of time of for example, from about 10 to about 120 minutes.

Illustrated in U.S. application Ser. No. 12/550,594, entitled Carbon Nanotube Containing Intermediate Transfer Members, filed Aug. 31, 2009, is for example, an intermediate transfer member comprised of a polyimide supporting substrate layer, and thereover a layer comprised of a photoinitiator, a polymer or a monomer, and a carbon nanotube.

Disclosed in copending application U.S. application Ser. No. 12/624,589, filed Nov. 24, 2009, entitled UV Cured Heterogeneous Intermediate Transfer Belts [ITB], the disclosure of which is totally incorporated herein by reference, is for example an intermediate transfer member comprising an ultraviolet (UV) curable polymer, wherein the UV curable polymer comprises a urethane acrylate; a photoinitiator being capable of initiating a curing of the UV curable polymer; and a plurality of carbon nanotubes dispersed in the UV curable polymer in an amount sufficient to provide the cured UV polymer a surface resistivity ranging of for example, about $10^8$ ohms/sq to about $10^{13}$ ohms/sq, and where the plurality of carbon nanotubes is for example, about 3% or less by weight of the cured polymer.

Illustrated in U.S. application Ser. No. 12/200,147, entitled Coated Seamed Transfer Member, filed Aug. 28, 2008, is a process which for example, comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

In embodiments of the present disclosure a number of components and processes of the cross-reference copending applications can be selected, such as for example the components of the supporting substrates, the photoinitiators, and the conductive components and the processes for the formation of seamed intermediate transfer members,

BACKGROUND

Disclosed are intermediate transfer members, and more specifically, intermediate transfer members that can be selected for receiving developed images followed by transferring these images in an electrostatographic, for example xerographic, including digital, image on image, and the like, machines or apparatuses and printers, and yet more specifically, printers that generate images of various colors. In embodiments, there are disclosed intermediate transfer members comprised of an optional supporting substrate such as a polyimide first layer, and a UV (ultraviolet light) curable or UV cured second layer comprised of a self conductive dendritic polyester polyol acrylate with for example, a resistivity of from about $10^8$ to about $10^{13}$ ohm/sq and from about $10^8$ to $10^{10}$ ohm/sq as measured by a Hiresta resistivity meter, (the language from about to about includes all values in between the values disclosed) and a photoinitiator; and which second layer may optionally include therein vinyl monomers, and acrylates, like for example, a fluorinated acrylate that primarily functions to assist in providing a low energy surface layer, permitting excellent toner transfer and acceptable toner and debris cleaning efficiencies in xerographic systems, and where the polyimide substrate layer when present further optionally includes a conductive component.

A number of advantages are associated with the intermediate transfer members of the present disclosure in embodiments thereof, such as acceptable mechanical characteristics, robustness, consistent, and excellent surface resistivities, excellent image transfer (toner transfer and toner cleaning), as compared to a number of known intermediate transfer members with a polyimide base layer and free of dendritic polyester polyol acrylates; acceptable adhesion properties, especially when there is included in the plural layered intermediate transfer member an adhesive layer; excellent maintained conductivity or resistivity for extended time periods; dimensional stability; ITB (intermediate transfer belt) humidity insensitivity for extended time periods; excellent dispersability in a polymeric solution; low and acceptable surface friction characteristics; and minimum or substantially no peeling or separation of the layers.

More specifically, the UV curing of the intermediate transfer members illustrated herein provides in embodiments almost zero VOC volatiles; preparation efficiencies, for example cured within seconds; excellent physical properties such as stain, abrasion, and solvent resistance together with superior toughness, and excellent gloss characteristics.

Also, the intermediate transfer members of the present disclosure are UV curable due primarily to the transparency characteristics of the dentritic polyester polyol acrylate containing layer and in embodiments which second layer possess for example, a surface resistivity of from about $10^8$ to about $10^{13}$ ohm/sq.

Accordingly, in embodiments of the present disclosure, the intermediate transfer members are UV curable which allows the UV light to penetrate across the dentritic polyester polyol acrylate containing second layer for a complete, almost 100 percent, cure. In comparison, intermediate transfer members that include about 5 weight percent of carbon black in a second layer in contact with a first supporting substrate layer, possesses a resistivity of for example, over $10^{14}$ ohm/sq. Also, a carbon black containing second layer substantially prevents UV light from penetrating deep into the layer, thus a preselected cure or a complete cure is difficult to obtain.

In a typical electrostatographic reproducing apparatus, such as xerographic copiers, printers, multifunctional machines, and the like a light image of an original to be copied is recorded in the form of an electrostatic latent image upon a photosensitive member or a photoconductor, and the latent image is subsequently rendered visible by the application of electroscopic thermoplastic resin particles and colorant. Generally, the electrostatic latent image is developed by contacting it with a developer mixture comprised of carrier granules having toner particles adhering triboelectrically thereto, or a liquid developer material, which may include a liquid carrier having toner particles dispersed therein. The developer mixture is advanced into contact with the electrostatic latent image, and the toner particles are deposited thereon in image configuration. Subsequently, the developed image is transferred to a document, such as paper and fixed or fused by for example heat and pressure. It is advantageous in some instances to transfer the developed image to a intermediate transfer web, belt or component, and subsequently, transfer with a high, for example about 90 to about 100, transfer efficiency the developed image from the intermediate transfer member to a substrate, like paper, cardboard, transparencies, and the like.

It has been reported in several U.S. patents that intermediate transfer members enable acceptable registration of the final color toner image in color systems using synchronous development of one or more component colors, and using one or more transfer stations; and all for an increase the number of substrates that can be selected. However, a disadvantage of using an intermediate transfer member is that a plurality of developed toner transfer operations is utilized thus causing charge exchange between the toner particles and the transfer member, which ultimately can cause less than complete toner transfer, resulting in low resolution images on the image receiving substrate, like paper, and image deterioration. When the image is in color, the image can additionally suffer from color shifting and color deterioration.

Attempts at controlling the resistivity of intermediate transfer members, such as intermediate transfer belts (ITB) by, for example, adding conductive fillers, such as ionic additives and/or carbon black to the outer or top layer, are disclosed in U.S. Pat. No. 6,397,034 which patent describes for example, the use of fluorinated carbon fillers in a polyimide intermediate transfer member layer. However, there can be problems associated with the use of a filler particles in that undissolved particles frequently bloom or migrate to the surface of the fluorinated carbon filler and cause imperfections on the surface, thereby causing nonuniform resistivity, which in turn causes poor antistatic properties and poor mechanical strength characteristics. Also, ionic additives on the ITB surface may interfere with toner release. Furthermore, bubbles may appear in or on the surface top layer, some of which can only be seen with the aid of a microscope, and other bubbles of which are large enough to be observed with the naked eye resulting in poor or nonuniform electrical properties, and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 to about 80 percent relative humidity, which limits the operational latitude.

Moreover, ion transfer may also occur in the U.S. Pat. No. 6,397,034 systems. The transfer of ions leads to charge exchanges and insufficient transfers, which in turn causes low image resolution and image deterioration, thereby adversely affecting the copy quality.

Therefore, it is desired to provide an intermediate transfer member with a number of the advantages illustrated herein, inclusive of enabling excellent mechanical, and humidity insensitivity characteristics; permitting high copy quality where for example, developed xerographic images with minimal resolution issues can be obtained. It is also desired to provide a weldable intermediate transfer belt that may not, but could have puzzle cut seams, and instead has a weldable seam, thereby providing a belt that can be manufactured without labor intensive steps, such as manually piecing together the puzzle cut seam with fingers, and without the lengthy high temperature and high humidity conditioning steps. Also, it is desired to generate by environmental acceptable standards intermediate transfer members, achievable in embodiments of the present disclosure, where these intermediate transfer members can be obtained in the absence of solution casting methods and where solvent evaporation is not present.

REFERENCES

Disclosed in U.S. Pat. No. 6,139,784 is a seamless belt containing a conductive powder and a polyimide resin, and more specifically, processes for the preparation of seamless belts.

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

EMBODIMENTS

In aspects thereof there is disclosed an intermediate transfer member comprised of an optional supporting substrate, and in contact with the substrate a cured mixture of a dendritic polyester polyol acrylate and a photoinitiator; an intermediate transfer member, such as an intermediate transfer belt, comprised of a supporting substrate, and in contact with the substrate in the configuration of a layer a crosslinked mixture comprised of a polyester polyol acrylate, an optional acrylate monomer and a photoinitiator; an intermediate transfer member comprised of a polyimide supporting substrate and thereover in the form of a layer a cured mixture of a branched polyester polyol acrylate, an optional acrylate, and a photoinitiator; a multi layer intermediate transfer member, such as a belt (ITB) comprised of self conductive, that is for example free of any conductive components, dendritic polyester polyol acrylate, a second acrylate, a vinyl monomer and a photoinitiator and an optional polyimide base layer, where the polyimide layer further includes as an optional additive a conductive component; an optional adhesive layer situated there between, and which layered member can be prepared by known casting methods, and known extrusion molded processes with the optional adhesive layer being generated, and applied by known spray coating and flow coating processes; an intermediate transfer member comprised of a supporting substrate, and in contact with the supporting substrate, a mixture of a photoinitiator, a dendritic polyester polyol acrylate, a vinyl monomer and a fluorinated acrylate oligomer and wherein the photoinitiator is one of α-hydroxyketone, acyl phosphine, benzyl ketal, α-aminoketone, benzophenone, and mixtures thereof; an intermediate transfer member comprised of a polyimide supporting substrate first layer, and a second layer comprised of a self conductive, where a conductive material, like carbon black is avoided, dendritic polyester polyol acrylate, an acrylate monomer, or a urethane acrylate, an optional vinyl monomer, and a photoinitiator selected from the group consisting of one of α-hydroxyketone, acyl phosphine, benzyl ketal, α-aminoketone, benzophenone, and mixtures thereof, an adhesive layer situated between the first layer and the second layer, and wherein the first layer further contains a known conductive component like a carbon black, a polyaniline, and the like; an intermediate transfer belt comprised of a polyimide substrate first layer, and thereover a layer comprised of a dendritic polyester polyol acrylate, and wherein the substrate layer further includes a conductive component, wherein the substrate is of a thickness of from about 20 to about 500 microns, and where the second layer may further include a polymer selected from the group consisting of a polyimide, a polycarbonate, a polyamideimide, a polyphenylene sulfide, a polyimide, a polysulfone, a polyetherimide, a polyester, a polyvinylidene fluoride, a polyethylene-co-polytetrafluoroethylene, and mixtures thereof present for example, in an amount of from about 1 to about 80, from about 10 to about 80, from about 25 to about 70, weight percent; an intermediate transfer wherein the dendritic polyester polyol acrylate possesses a weight average molecular weight of from about 500 to about 5,000, and a hydroxyl value of from about 200 to about 1,000 milligrams KOH/gram, a weight average molecular weight of from about 1,000 to about 3,000, and a hydroxyl value of from about 300 to about 850 milligrams KOH/gram, and a weight average molecular weight of from about 1,500 to about 2,500, and a hydroxyl value of from about 400 to about 700 milligrams KOH/gram, an intermediate transfer member where a dendritic polyester polyol acrylate is generated by the reaction of an acrylic acid and a dendritic polyester polyol; and an intermediate transfer member, especially as it is applicable to a film or a belt configuration, with a circumference of for example, from about 240 to about 2,500 millimeters, from about 1,700 to about 3,000 millimeters, or from about 2,000 to about 2,300 millimeters with a corresponding width of, for example, from about 100 to about 1,000 millimeters, from about 200 to about 500 millimeters, or from about 300 to about 400 millimeters; an intermediate transfer member where the photoiniator is an α-hydroxyketone selected from the group consisting of at least one of 1-hydroxy-cyclohexylphenyl ketone, 2-hydroxy-2-methyl-1-phenyl-1-propanone, and 2-hydroxy-1-[4-(2-hydroxyethoxy)phenyl]-2-methyl-1-propanone, present in an amount of from about 10 to about 90 weight percent of said photoinitiator mixture; and the benzophenone is represented by

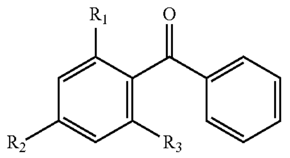

where $R_1$, $R_2$ and $R_3$ each represents H or alkyl, and the benzophenone is present in an amount of from about 90 to about 10 weight percent of said photoinitiator mixture; and an intermediate transfer member the α-hydroxyketone is 1-hydroxy-cyclohexylphenyl ketone, present in an amount of about 50 weight percent and said benzophenone is represented by and is present in an amount of about 50 weight percent of said mixture; and an intermediate transfer further containing in the polyester polyol acrylate mixture an acrylate of trimethylolpropane triacrylate, butanediol diacrylate, (hexanediol diacrylate, tripropyleneglycol diacrylate, dipropyleneglycol diacrylate, phenoxyethyl acrylate, trimethylolpropaneformal monoacrylate, 4-t-butylcyclohexyl acrylate, lauryl acrylate, ethyldiglycol acrylate, butandiol monoacrylate, (dihydrodicyclopentadienyl acrylate, or a fluorinated acrylate oligomer, and wherein said acrylate possesses a weight average molecular weight of from about 300 to about 5,000, and a number average molecular weight of from about 200 to about 4,000

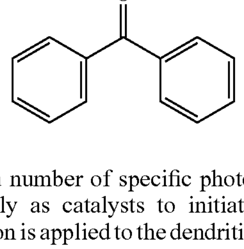

Examples of a number of specific photoinitiators, which function primarily as catalysts to initiate polymerization when UV radiation is applied to the dendritic polyester polyol acrylate containing layer, selected for the intermediate transfer members illustrated herein include but are not limited to α-hydroxyketones, acyl phosphines, benzyl ketals, α-aminoketones, benzophenones and mixtures thereof, and which photoinitiators or mixtures thereof are selected in various suitable amounts, such as illustrated herein, and, for example, from about 0.1 to about 20 weight percent, from about 0.5 to about 10 weight percent, from about 1 to about 10 weight percent, from about 3 to about 7 weight percent, and from 1 to about 5 weight percent. When mixtures of photoinitators are selected, such as two photoinitators, from about 1 to about 99 weight of a first initator is selected and from about 99 to about 1 weight percent of the second initiator is selected and more specifically there can be present in the intermediate transfer member from about 10 to about 90 weight percent of the first initiator and, from about 90 to about 10 of the second initiator, from about 25 to about 75 weight percent of the first initiator and, from about 75 to about 25 of the second initiator, from about 40 to about 60 weight percent of the first initiator and, from about 60 to about 40 of the second initiator; and yet more specifically about 50 weight percent of the first initiator and and 50 weight percent of the second initiator, and where the total amount of the initiators mixture is about 100 percent.

Examples of the α-hydroxyketone photoinitiators selected for the second layer include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals.

Examples of acyl phosphine photoinitiators selected for the second layer include mono acyl phosphine oxide (MAPO) such as DAROCUR® TPO; and bis acyl phosphine oxide (BAPO) such as IRGACURE® 819, both available from Ciba Specialty Chemicals. Specific examples of the acyl phosphine photoinitiators are diphenyl(2,4,6-trimethylbenzoyl) phosphine oxide (DAROCUR® TPO), diphenyl(2,4,6-trimethylbenzoyl)phosphine oxide (ESACURE® TPO, LAMBERTI Chemical Specialties, Gallarate, Italy), diphenyl(2,4,6-trimethylbenzoyl)phosphine oxide (FIRSTCURE® HMPP available from Albemarle Corporation, Baton Rouge, La.), diphenyl(2,4,6-trimethylbenzoyl)phosphine oxide (LUCIRIN® TPO, available from BASF, Ludwigshafen, Germany), diphenyl(2,4,6-trimethylbenzoyl) phosphinate (LUCIRIN® TPO-L), and phenyl bis(2,4,6-trimethyl benzoyl)phosphine oxide (IRGACURE® 819, available from Ciba Specialty Chemicals).

Examples of α-aminoketones photoinitiators include 2-benzyl-2-(dimethylamino)-1-[4-(4-morpholinyl)phenyl]-1-butanone (IRGACURE® 369), and 2-methyl-1-[4-(methylthio)phenyl]-2-(4-morpholinyl)-1-propanone (IRGACURE 907), both available from Ciba Specialty Chemicals.

Benzyl ketal photoinitiators include α,α-dimethoxy-α-phenylacetophenone (IRGACURE° 651), available from Ciba Specialty Chemicals. Benzophenone photoinitiator examples selected for the second surface layer include benzophenone (DAROCUR® BP), available from Ciba Specialty Chemicals.

The photoinitiators function primarily as catalysts to initiate polymerization when UV radiation is applied to the dendritic polyester polyol acrylate containing layer, and which photoinitiators are present, for example, in an amount of from about 0.5 to about 10 weight percent, or from about 3 to about 6 weight percent of the UV cured surface layer components.

Examples of dendritic polyester polyol acrylates selected for the intermediate transfer members of the present disclosure and which can be UV cured are generally known and can be obtained from Perstorp Specialty Chemicals (Perstorp, Sweden) as BOLTORN® P500 (OH value of 560 to 630 milligrams KOH/gram, $M_w$ (GPC)=1,800), BOLTORN® P1000 (OH value of 430 to 490 milligrams KOH/grams, $M_w$ (GPC)=1,500), BOLTORN° H20 (OH value of 490 to 520 milligrams KOH/grams, $M_w$ (GPC)=2,100, $T_g$=25° C.), BOLTORN® H2003 (OH value of 280 to 310 milligrams KOH/grams, $M_w$ (GPC)=2,500, $T_g$=−5° C.). In embodiments, a dendritic polyester polyol acrylate selected for the UV curable mixture layer can be formed by, for example, first, the polymerization of a core, such as trimethylolpropane and branches extending therefrom of 2,2-dimethylol propionic acid (Bis-MPA), yielding a dendritic polyester polyol; and second, the reaction of the formed dendritic polyester polyol with an acrylic acid.

In embodiments, the dendritic, branched, or crosslinked polyester polyol acrylate possesses for example, a weight average molecular weight of from about 500 to about 5,000, or from about 1,000 to about 3,000 as determined by known methods, such as GPC analysis, and a hydroxyl value of for example, from about 200 to about 1,000 milligrams KOH/gram, or from about 300 to about 700 milligrams KOH/gram.

The dendritic polyester polyol acrylate is present in the UV curable layer in amounts of for example, from about 50 to about 99 weight percent, from about 60 to about 98 weight percent, from 70 to about 97 weight percent, and more specifically, about 97 weight percent based on the weight percentage of the components in the curable or second layer.

The known term dendritic as is applicable to the dendritic polyester polyol acrylate illustrated herein, refers for example, to tree like in form or structure. Thus, a dendritic polyester polyol acrylate can be considered in embodiments of the present disclosure repeatedly branched, roughly spherical in shape polymers or large molecules and yet more specifically dendritic refers to a highly branched, for example from about 75 to about 100 percent, from about 80 to about 99 percent, from about 80 to about 95 percent, from about 90 to about 99 percent, and where in embodiments the branches are polyester polyol acrylates.

The UV curing can be completed at various temperatures, such as from example, from about 20 to about 65 degrees Centigrade, from about 25 to about 50 degrees Centigrade, from about 20 to about 40 degrees Centigrade and more specifically from about 30 to about 35 degrees Centigrade. Subsequent to curing there is formed a crosslinked polymeric network with the acrylate segments or groups chemically connecting and bonding together. While not be desired to be limited by theory the crosslinking percentage of the cured surface layer in contact with a supporting substrate is believed to be for example, from about 45 to about 95 percent, from about 50 to about 85 percent, or from about 55 to about 80 percent.

Examples of supporting substrates include polyimides, polyamideimides, polyetherimides, and mixtures thereof, and other known suitable substrates.

Specific examples of supporting substrates are polyimides inclusive of known low temperature and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180 to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, all commercially available from E.I. DuPont, Wilmington, Del.

Suitable supporting substrate polyimides include those formed from various diamines and dianhydrides, such as polyimide, polyamideimide, polyetherimide, and the like. More specifically, polyimides include aromatic polyimides, such as those formed by reacting pyromellitic acid and diaminodiphenylether, or by imidization of copolymeric acids, such as biphenyltetracarboxylic acid and pyromellitic acid with two aromatic diamines, such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

Examples of polyamideimides that can be selected as supporting substrates are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® Al-10 ($T_g$=272° C.), commercially available from Solvay Advanced Polymers, LLC, Alpharetta, Ga.

Polyetherimide supporting substrates examples are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 $T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics where Tg refers to the glass transition temperature.

The optional conductive material, such as for example, a carbon black, a metal oxide or a polyaniline, is present in the supporting substrate layer of the intermediate transfer member in, for example, an amount of from about 1 to about 50 weight percent, from about 3 to about 40 weight percent, from about 5 to about 30 weight percent, or more specifically from about 5 to about 20 weight percent.

Examples of carbon blacks selected as the conductive component for the ITM (intermediate transfer member) include VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1.000 (B.E.T. surface area=343 $m^2$/g, DBP absorption=1.05 ml/g), BLACK PEARLS® 880 (B.E.T. surface area=240 $m^2$/g, DBP absorption=1.06 ml/g), BLACK PEARLS® 800 (B.E.T surface area=230 $m^2$/g, DBP absorption=0.68 ml/g), BLACK PEARLS® L (B.E.T. surface area=138 $m^2$/g, DBP absorption=0.61 ml/g), BLACK PEARLS® 570 (B.E.T. surface area=110 $m^2$/g, DBP absorption=1.14 ml/g), BLACK PEARLS® 170 (B.E.T. surface area=35 $m^2$/g, DBP absorption=1.22 ml/g), VULCAN® XC72 (B.E.T. surface area=254 $m^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 $m^2$/g, DBP absorption=0.59 ml/g), REGAL® 400 (B.E.T. surface area=96 $m^2$/g, DBP absorption=0.69 ml/g), REGAL® 330 (B.E.T. surface area=94 $m^2$/g, DBP absorption=0.71 ml/g), MONARCH® 880 (B.E.T. surface area=220 $m^2$/g, DBP absorption=1.05 ml/g, primary particle diameter=16 nanometers), and MONARCH® 1000 (B.E.T. surface area=343 $m^2$/g, DBP absorption=1.05 ml/g, primary particle diameter=16 nanometers); Channel carbon blacks available from Evonik-Degussa; Special Black 4 (B.E.T. surface area=180 $m^2$/g, DBP absorption=1.8 ml/g, primary particle diameter=25 nanometers), Special Black 5 (B.E.T. surface area=240 $m^2$/g, DBP absorption=1.41 ml/g, primary particle diameter=20 nanometers), Color Black FW1 (B.E.T. surface area=320 $m^2$/g, DBP absorption=2.89 ml/g, primary particle diameter=13 nanometers), Color Black FW2 (B.E.T. surface area=460 $m^2$/g, DBP absorption=4.82 ml/g, primary particle diameter=13 nanometers), and Color Black FW200 (B.E.T surface area=460 $m^2$/g, DBP absorption=4.6 ml/g, primary particle diameter=13 nanometers). Other known suitable carbon blacks not specifically disclosed may be selected as the conductive component for the supporting substrate layer.

In embodiments, the polyaniline conductive component selected for incorporation into the supporting substrate of the intermediate transfer members (ITM) disclosed herein are PANIPOL™ F, commercially available from Panipol Oy, Finland; and known lignosulfonic acid grafted polyanilines. These polyanilines usually have a relatively small particle size diameter of, for example, from about 0.5 to about 5 microns, from about 1.1 to about 2.3 microns, from about 1.2 to about 2 microns, from about 1.5 to about 1.9 microns, or about 1.7 microns.

Examples of metal oxides selected as a conductive component for the ITM include tin oxide, antimony doped tin oxide, indium oxide, indium tin oxide, zinc oxide, and titanium oxide and the like.

An adhesive layer usually situated between the supporting substrate, and the cured or second layer thereover includes, for example, a number of resins or polymers of epoxy, urethane, silicone, polyester, and the like with for example, a viscosity of from about 1,200 to about 2,000 cps. Generally, the adhesive layer is a solventless layer, that is, materials that are liquid at room temperature (about 25° C.), and are able to crosslink to an elastic or rigid film to adhere at least two materials together. Specific adhesive layer components include 100 percent solids adhesives including polyurethane adhesives obtained from Lord Corporation, Erie, Pa., such as TYCEL® 7924 (viscosity of from about 1,400 to about 2,000 cps), TYCEL® 7975 (viscosity of from about 1,200 to about 1,600 cps) and TYCEL® 7276. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, as illustrated hereinafter.

The thickness of each layer of the intermediate transfer member can vary, and is usually not limited to any specific value. In specific embodiments, the substrate layer or first layer thickness is, for example, from about 20 to about 300 microns, from about 30 to about 200 microns, from about 75 to about 150 microns, and from about 50 to about 100 microns, while the thickness of the top second cured layer is, for example, from about 1 to about 150 microns, from about 10 to about 100 microns, from about 20 to about 70 microns, and from about 30 to about 50 microns. The adhesive layer thickness is, for example, from about 0.001 to about 0.1 micron, from about 0.005 to about 0.075 micron, or from about 0.05 to about 0.1 micron.

Examples of acrylates and vinyl monomers selected as a reactant, for example, the C═C double bond of the acrylate or vinyl monomer is copolymerized with the C═C double bond of the disclosed dendritic polyester polyol acrylate via a known free radical polymerization, and as diluents or additives for incorporation into the second cured layer are for example, LAROMER® TMPTA (trimethylolpropane triacrylate), BDDA (butanediol diacrylate), HDDA (hexanediol diacrylate), TPGDA (tripropyleneglycol diacrylate), DPGDA (dipropyleneglycol diacrylate), POEA (phenoxyethyl acrylate), LR8887 (trimethylolpropaneformal monoacrylate), TBCH (4-t-butylcyclohexyl acrylate), LA (lauryl acrylate 12114), EDGA (ethyldiglycol acrylate), BDMA (butandiol monoacrylate), DCPA (dihydrodicyclopentadienyl acrylate), DVE-3 (triethyleneglycol divinyl ether), vinyl caprolactam, n-vinyl formamide, all available from BASF; and CN4000 (a fluorinated acrylate oligomer with for example, a viscosity of about 35 cps at 25 degrees Centigrade and a surface tension of for example, about 20 dynes/cm.), available from Sartomer Co., Warrington, Pa., and the like, and mixtures thereof, present in an amount of for example, from about 1 to about 40 weight percent, or from about 5 to about 20 weight percent of the total ITB layer components.

The acrylate monomers or vinyl monomers additives function, for example, as diluents to reduce the viscosity of the coating dispersion, and solvents for the photoinitiators, and crosslink with the dendritic polyester polyol acrylates by UV radiation to further provide for the intermediate transfer layer integrity and strength.

Examples of the urethane acrylate additives that are included in the surface or second cured layer include aromatic urethane acrylates and aliphatic urethane acrylates, and mixtures thereof.

Specific examples of aromatic urethane acrylates incorporated into the second layer include CN2901, an aromatic urethane triacrylate oligomer ($T_g$=35° C.); CN2902, an aromatic urethane triacrylate oligomer ($T_g$=25° C.); CN9782, a difunctional aromatic urethane acrylate oligomer; CN9783, a difunctional aromatic urethane acrylate oligomer; CN992, an aromatic polyester based urethane diacrylate oligomer; CN994, an aromatic urethane acrylate oligomer ($T_g$=50° C.); CN999, a low viscosity aromatic urethane oligomer ($T_g$=35° C.); CN997, a hexafunctional aromatic urethane acrylate oligomer; CN2600, a brominated aromatic urethane acrylate oligomer ($T_g$=88.8° C.); CN902J75, a brominated urethane acrylate oligomer containing 25 percent isobornyl acrylate; CN975, a hexafunctional aromatic urethane acrylate oligomer ($T_g$=−12° C.); CN978, an aromatic polyether based urethane diacrylate oligomer ($T_g$=−40° C.); CN972, an aromatic polyether based urethane triacrylate oligomer ($T_g$=−47° C.); CN9022, a urethane acrylate ester ($T_g$=−16° C.), all available from Sartomer Company, Inc., Exton, Pa.; and LAROMER® UA 9031V, available from BASF.

Aliphatic urethane acrylates examples incorporated into the second layer include CN9002, a difunctional aliphatic urethane acrylate oligomer; CN9004, a difunctional aliphatic urethane acrylate oligomer; CN9005, a difunctional aliphatic urethane acrylate oligomer ($T_g$=−10° C.); CN9006, a hexafunctional aliphatic urethane acrylate oligomer ($T_g$=83° C.); CN9007, a difunctional aliphatic urethane acrylate oligomer; CN9178, a difunctional aliphatic urethane acrylate oligomer; CN9290US, a difunctional aliphatic urethane acrylate oligomer ($T_g$=28° C.); CN940, a difunctional aliphatic urethane oligomer; CN9788, a difunctional aliphatic urethane oligomer; CN989, a trifunctional aliphatic urethane acrylate oligomer; CN9893, a difunctional aliphatic urethane oligomer; CN996, a urethane acrylate oligomer; CN9009, an aliphatic urethane acrylate oligomer ($T_g$=40° C.); CN9010, an aliphatic urethane acrylate oligomer ($T_g$=103° C.); CN3211, an aliphatic urethane acrylate oligomer; CN9001, an aliphatic urethane acrylate oligomer ($T_9$=60° C.); CN2920, an aliphatic urethane acrylate oligomer ($T_g$=59° C.); CN9011, an aliphatic urethane oligomer; CN929, a trifunctional aliphatic polyester urethane acrylate oligomer ($T_g$=17° C.); CN962, an aliphatic polyester based urethane diacrylate oligomer ($T_g$=−38° C.); CN965, an aliphatic polyester based urethane diacrylate oligomer ($T_g$=−37° C.); CN991, an aliphatic polyester based urethane diacrylate oligomer; CN980, a urethane acrylate oligomer ($T_g$=−29° C.); CN-981, an aliphatic polyester/polyether based urethane diacrylate oligomer ($T_g$=22° C.); CN964, an aliphatic polyester based urethane diacrylate oligomer ($T_g$=−24° C.); CN968, an aliphatic polyester based urethane hexaacrylate oligomer ($T_g$=34° C.); CN983, an aliphatic polyester based urethane diacrylate oligomer; CN984, an aliphatic polyester based urethane diacrylate oligomer; CN9008, a trifunctional aliphatic polyester urethane acrylate oligomer ($T_g$=111° C.); CN9024, an aliphatic urethane acrylate; CN9013, a multifunctional urethane acrylate oligomer ($T_g$=143° C.); CN9014, an aliphatic urethane acrylate oligomer ($T_g$=−41° C.), all available from Sartomer Company, Inc., Exton, Pa.; and LAROMER® UA 19T, UA 9028V, UA 9030V, LR 8987, UA 9029V, UA 9033V, all available from BASF.

The disclosed intermediate transfer members are, in embodiments, weldable, that is the seam of the member like a belt is weldable, and more specifically, may be ultrasonically welded to produce a seam and with a surface resistivity as measured with a known High Resisitivity Meter, of for example, from about $10^8$ to about $10^{13}$ ohm/sq, or from about $10^9$ to about $10^{12}$ ohm/sq. The sheet resistivity of the intermediate transfer weldable member is, for example, from about $10^8$ to about $10^{13}$ ohm/sq, or from about $10^9$ to about $10^{12}$ ohm/sq.

The intermediate transfer members illustrated herein like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

Subsequent to the toner latent image being transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiments, the intermediate transfer member further includes an outer release layer.

Optional release layer examples situated on and in contact with the second top layer, and of a suitable thickness of, for example, from about 0.5 to about 50 microns, from about 1 to about 30 microns, from about 1 to about 5 microns, and from about 0.01 to about 10 microns, include suitable materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture with, for example, a molecular weight $M_w$ of approximately 3,500); and fluoroelastomers such as those available as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, and hexafluoropropylene, known commercially as VITON A®; (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers are those available from E.I. DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable known commercially available cure site monomers.

The ITM layer or layers may be deposited on the substrate by known coating processes such as dipping, spraying, such as by multiple spray applications of thin films, casting, flow coating, web coating, roll coating, extrusion, molding, or the like. In embodiments, the layer or layers can be deposited or generated by spraying such as by multiple spray applications of thin films, casting, by web coating, by flow coating, and more specifically, by lamination.

Throughout the disclosure and claims, the phrase "from about to about" includes all values therebetween, thus from about 1 to about 50 includes all numbers in between 1 and 50 like 1 to 10, 10 to 20, 20 to 30, 30 to 40, and 40 to 50, and more specifically, for example, 1 to 10 includes at least 1, 2, 3, 4, 5, 6, 7, 8, 9, and 10.

Specific embodiments will now be described in detail. These examples are intended to be illustrative, and are not limited to the materials, conditions, or process parameters set forth. All parts are percentages by weight of total solids unless otherwise indicated.

EXAMPLE I

A polyimide base or supporting layer was prepared as follows. One gram of Special Black 4 (B.E.T. surface area=180 $m^2/g$, DBP absorption=1.8 ml/g, primary particle diameter=25 nanometers), as obtained from Evonik-Degussa, was mixed with 26.25 grams of a polyamic acid (polyimide precursor) solution, VTEC™ PI 1388 (20 weight percent solution in N-methylpyrrolidone, $T_g$>320° C.), as obtained from Richard Blaine international, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate resulting in a polyimide base layer of polyimide/carbon black ratio of 84/16 with a thickness of 75 microns.

A second layer, subsequently coated on the above polyimide supporting substrate base layer was prepared as follows: 9.7 grams of the dendritic polyester polyol acrylate, BOLTORN® P500 (OH value of 560 to 630 milligrams KOH/grams, $M_w$ (GPC)=1,800), obtained from Perstorp Specialty Chemicals, Perstorp, Sweden, was mixed with 0.3 gram of the photoinitiator, IRGACURE® 500 (50 weight percent, 0.15 grams, of 1-hydroxy-cyclohexylphenyl ketone and 50 weight percent, 0.15 grams, percent of benzophenone, obtained from Ciba Specialty Chemicals). The resulting clear solution was then coated on the above prepared polyimide first or supporting layer present on the glass plate using a draw bar coating method. Subsequently, the resulting dual layer film obtained was cured at a temperature of between about 25 and 40 degrees Centigrade and more specifically at 32 degrees Centigrade using a Hanovia UV instrument for 10 seconds (325 nanometer UV, 125 watts).

The above obtained dual layer film on the glass was then immersed into water overnight, about 23 hours, and the free-standing film was released from the glass automatically resulting in a dual layer intermediate transfer member with a 75 micron thick carbon black/polyimide base layer with a ratio by weight percent of 14 carbon black and 86 polyimide, and the above 10 micron thick UV cured surface layer present on the above polyimide base layer with a ratio by weight percent of BOLTORN® P500/IRGACURE® 500 of 9713.

EXAMPLE II

A dual layer transfer member was prepared by repeating the process of Example I except that the second layer coating was prepared as follows: 9.6 grams of the dendritic polyester polyol acrylate, BOLTORN® P500 (OH value of 560 to 630 milligrams KOH/grams, $M_w$ (GPC)=1,800), obtained from Perstorp Specialty Chemicals, Perstorp, Sweden, was mixed with 0.3 gram of the photoinitiator, IRGACURE® 500 (50 weight of 1-hydroxy-cyclohexylphenyl ketone and 50 weight of benzophenone, obtained from Ciba Specialty Chemicals) and 0.1 gram of SARTOMER® CN4001, a fluorinated acrylate oligomer, obtained from Sartomer Company, Inc., Exton, Pa. The resulting solution clear in color, was then coated on the above polyimide bottom, or first layer present on the glass plate using a draw bar coating method, followed by cured for 10 seconds at about 32 degrees Centigrade using a Hanovia UV instrument (325 nanometer UV, 125 watts).

The above obtained dual layer film on the glass was then immersed into water overnight, about 23 hours, and the free-standing film was released from the glass automatically resulting in a dual layer intermediate transfer member with a 75 micron thick carbon black/polyimide base layer with a ratio by weight percent of 14 carbon black and 86 polyimide, and the above 10 micron thick UV cured surface layer coated on the above polyimide base layer. The ratio by weight percent of BOLTORN® P500/IRGACURE® 500/SARTOMER® CN4001 was 96/3/1.

EXAMPLE III

A dual layer transfer member was prepared by repeating the process of Example I except that the second layer coating of BOLTORN® P500/IRGACURE® 500 of 97/3, was replaced with BOLTORN® P1000 (OH value of 430 to 490 milligrams KOH/grams, $M_w$ (GPC)=1,500), obtained from Perstorp Specialty Chemicals, Perstorp, Sweden. The BOLTORN® P1000IRGACURE® 500 ratio was 97/3.

Surface Resistivity Measurement

The above ITB members of Examples I and II were measured for surface resistivity (averaging four to six measurements at varying spots, 72° F./65 percent room humidity) using a High Resistivity Meter (Hiresta-Up MCP-HT450 available from Mitsubishi Chemical Corp.). The results are provided in Table 1.

TABLE 1

| | Surface Resistivity (Ohm/sq) | Water contact angle in degrees |
|---|---|---|
| Example I | $4.5 \times 10^9$ | 72° |
| Example II | $4.8 \times 10^9$ | 99° |

Water Contact Angle Measurement

The advancing contact angles of deionized water on the surface layers of Examples I and II were measured at ambient temperature (about 23° C.) using Contact Angle System OCA (Dataphysics Instruments GmbH, model OCA15). At least ten measurements are performed, and their averages are reported in Table 1 as the water contact angle in degrees.

With incorporation of a fluorinated acrylate oligomer into the UV cured surface layer (Example II), the surface layer became more hydrophobic as demonstrated by the increase in the water contact angle of about 27° of from 72 to 99 degrees. The Example I and II hydrophobic UV cured surface layer is believed to be beneficial to increasing toner transfer by about 20 percent and improves the xerographic machine toner and debris cleaning efficiency by about 25 percent in view of the above contact angles which translates into a low surface energy for the intermediate transfer belts as compared to an intermediate transfer member comprised of only the polyimide substrate layer itself of Examples I and II which possessed a water contact angle of about 68 and 70 degrees respectively.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consistng of said member being connected to a photoconductor, and which member consists of a supporting substrate, and in contact with said substrate a cured mixture of a dendrite polyester polyol acrylate and a photoinitiator, wherein ad cured is accomplished by heating with UV radiation said mixture at a temperature of from about 30 to about 50 degrees Centigrade thereby forming a crosslinked polymeric network with acrylate substituents chemically bonded to each other and wherein said dendrite polyester polyolacrylate, prior to being cured, possesses a weight average molecular weight of from about 500 to about 5,000, and wherein said member accepts a xerographic image from said photoconductor and subsequently said image is transferred to a document.

2. An intermediate transfer member in accordance with claim 1 wherein said dendritio polyester polyol acrylate possesses a weight average molecular weight of from about 1500 to about 3000 and a hydroxyl value of from about 400 to about 700 milligrams KOH/gram.

3. An intermediate transfer member in accordance with claim 1 wherein said dendrite polyester polyol acrylate is generated by the reaction of an acrylic acid and a dendrite polyester polyol.

4. An intermediate transfer member in accordance with claim 1 wherein said dendritic polyester polyol is formed by the polymerization of trimethylolpropane and a dimethylol propionic acid.

5. An intermediate transfer member in accordance with claim 1 wherein said photoinitiator is selected from the group consisting of at least one of an acyl phosphine, an α-hydroxyketone, a benzyl ketal, an α-aminoketone, a benzophenone and mixtures thereof.

6. An intermediate transfer member in accordance with claim 1 wherein said photoinitiator is selected from the group consisting of diphenyl (2,46-trimethylbenzoyl) phosphine oxide, diphenyl (2,4.6-trimethylbenzoyl) phosphinate, phenyl bis(2,46-trimethyl benzoyl) phosphine oxide, 1-hydroxy-cyclohexylphenyl ketone, 2-hydroxy-2-methyl-1-phenyl-1-propanone, 2-hydroxy-1-[4-(2-hydroxyethoxy) phenyl[-2 -methyl-1-propanone, 2-benzyl-2-(dimethylamino)-1-[4-(4-morpholinyl) pheny]1-butanone, 2-methyl-1-1-[4-(methyithio)phenyl]-2-(4-morpholinyl)-1-propanone, α,α-dimethoxy-α-phenylacetophenone and benzophenone.

7. An intermediate transfer member in accordance with claim 1 wherein sad photoinitiator consists of a mixture of an α-hydroxyketone and a benzophenone.

8. An intermediate transfer member in accordance with claim 7 wherein said α-hydroxyketone is selected from the group consisting of at least one of 1-hydroxy-cyclohexyphenyl ketone, 2-hydroxy--2-methyl-1-phenyl-1-propanone, and 2-hydroxy-1-1-[4(2-hydroxyethoxy)phenyl]-2-methyl-1-propanone and said benzophenone is represented by

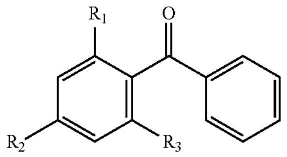

where $R_1$, $R_2$ and $R_3$ each represents H or alkyl.

9. An intermediate transfer member in accordance with claim 7 wherein said α-hydroxyketone is 1-hydroxy-cyclohexylphenyl ketone and said benzophenone is represented by

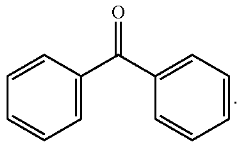 [SMILES: O=C(c1ccccc1)c1ccccc1]

10. An intermediate transfer member in accordance with claim 1 containing in said mixture an acrylate of trimethylolpropane triacrylate, butanediol diacrylate, dipropyleneglycol diacrylate, phenoxyethyl acrylate; trimethylolpropaneformal monoacrylate, 4-t-butylcyclohexyl acrylate, lauryl acrylate, ethyldiglycol acrylate, butandiol monoacrylate, (dihydrodicyclopentadienyl acrylate), or a fluorinated acrylate oligomer, and wherein said acrylate possesses a weight average molecular weight of from about 300 to about 5,000, and a number average molecular weight of from about 200 to about 4,000.

11. An intermediate transfer member in accordance with claim 1 wherein said mixture contains a fluorinated acrylate oligomer and said substrate is a polyimide and wherein said dendritic polyester polyol acrylate is present in an amount of from about 70 to about 99 weight percent, and said fluorinated acrylate is present in an amount of from about 1 to about 29 weight percent.

12. An intermediate transfer member in accordance with claim 1 wherein said dentritic polyester polyol acrylate is present in an amount of from about 85 to about 98 weight percent and said substrate is a polyimide.

13. An intermediate transfer member in accordance with claim 1 containing an acrylate monomer in said mixture.

14. An intermediate transfer member in accordance with claim 1 that includes an outer release layer positioned on said cured mixture and wherein said release layer comprises a fluorinated ethylene propylene copolymer, a polytetrafluoroethyene, a polyfluoroalkoxy polytetrafluoroethylene, a fluorosilicone, a polymer of vinylidenefluoride, hexafluoropropylene, and tetrafluoroethylene, or mixtures thereof.

15. An intermediate transfer member in accordance with claim 1 wherein said substrate is a polyimide, a polyamideimide, or a polyetherimide, and wherein said mixture contains an acrylate monomer, or a vinyl monomer and wherein said supporting substrate contains a carbon black, a metal oxide, or a polyaniline each present in an amount of from about 1 to about 20 percent by weight of the total substrate components.

16. An intermediate transfer member consisting of said member being connected to a photoconductor, and which member consists of a supporting substrate, and in contact with said substrate in the configuration of a layer a crossiinked mixture of a polyester polyol acrylate, an acrylate monomer and a photoinitiator residue.

17. An intermediate transfer member in accordance with claim 16 wherein said polyester polyol acrylate is formed by the reaction of an acrylic acid and a polyester polyol, and said polyester polyol is formed by the polymerization of trimethylolpropane and 2,2-dimethylol propionic acid; said acrylate is trimethyiolpropane triacrylate, butanediol diacrylate, hexanediol diacrylate, tripropyleneglycol diacrylate, dipropyleneglycol diacrylate, phenoxyethyl acrylate, trimethylolpropaneformal monoacrylate, 4-t-butylcyclonexyl acrylate, lauryl acrylate, ethyldiglycol acrylate, butandiol monoacrylate, dihydrodicyclopentadienyl acrylate, or a fluorinated acrylate oligomer, and said photoinitiator consists of a mixture of an α-hydroxyketone and a benzophenone.

18. An intermediate transfer member in accordance with claim 16 wherein said substrate is a polyimide, said polyester polyol acrylate is present in an amount of from about 90 to about 99 weight percent, said acrylate is a fluorinated acrylate oligomer present in an amount of from about 0.1 to about 5 weight percent, and said photoinitiator consists of a mixture of 1-hydroxy-cyclohexylphenyl ketone and benzophenone, and said crossiinked amount is from about 75 percent to about 100percent.

19. An intermediate transfer member comprised of said member being connected to a photoconductor, and which member is comprised of a polyimide supporting substrate and thereover in the form of a layer a cured mixture of a branched polyester polyol acrylate, an acrylate, and a photoinitiator residue and wherein said cured is accomplished by heating with UV radiation said mixture thereby forming a crosslinked polymeric network with acrylate substituents chemically bonded to each other.

20. An intermediate transfer member in accordance with claim 19 wherein said branched polyester polypol acrylate is formed by the reaction of acrylic acid and a branched polyester polyol, and said branched polyester polyol is formed by the polymerization of trimethylolpropane and a dimethylol propionic acid; said acrylate is present and is selected from the group consisting of trimethylolpropane triacrylate, butonediol, diacrylate, hexanediol diacrylate, tripropyleneglycol diacrylate, dipropyleneglycol diacrylate, ,phenoxyethyl acrylate, trimethylolpropaneformal menoacrylate, 4-t-butylcyclohexyl acrylate, lauryl acrylate, ethyldiglycol acrylate, butandiol monoacrylate, (dihydrodicyclopentedienyl acrylate), and a fluorinated acrylate oligomer, said photoinitiator is selected from the group consisting of diphenyl (2,4,6-trimethylbenzoyl) phosphine oxide, diphenyl (2,4,6-trimethylbenzoyl) phosphinate, phenyl bis(2,4,6-trimethyl benzoyl) phosphine oxide, 1-hydroxy-cyclohexylphenyl ketone, 2-hydroxy-2-methyl-1- phenyl-1-propanene, 2-hydroxy-1-[4-(2-hydroxyethoxy) phenyl]-2-methyl-1 propanone, 2-benzyl-2-(dimethylamino)-1-[4-(4-morpholinyl) phenyl]-1butanone, 2-methyl-1-[4-(methylthrio)phenyl]-2-(4-morpholinyl)-1-propanone, benzophenone, and α,α-dimethoxy-α-phenylacetophenone, and said branching amount for said polyester polyol acrylate subsequent to said curing by heating with UV radiation is from about 75 percent to about 100 percent.

21. An intermediate transfer member in accordance with claim 1 wherein said photoinitiator is selected from the group consisting of a component represented by

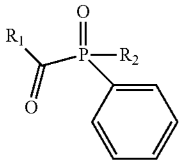
and
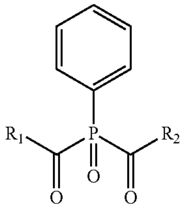
wherein $R_1$, and $R_2$ are alkyl or aryl.
22. An intermediate transfer member in accordance with claim 21 wherein alkyl contains, from 1 to about 12 carbon atoms, and aryl contains from 6 to about 18 carbon atoms.
23. An intermediate transfer member in accordance with claim 19 wherein said branching amount is from about 75 to about 100 percent.
* * * * *